No. 788,234. PATENTED APR. 25, 1905.
S. L. ALLEN.
CULTIVATOR.
APPLICATION FILED JAN. 10, 1903.

3 SHEETS—SHEET 3.

WITNESSES:
Jno. F. Cross,
Chas. K. Bennett

INVENTOR:
Samuel L. Allen,
by Horace Pettit
ATTORNEY.

No. 788,234. Patented April 25, 1905.

UNITED STATES PATENT OFFICE.

SAMUEL L. ALLEN, OF MOORESTOWN, NEW JERSEY.

CULTIVATOR.

SPECIFICATION forming part of Letters Patent No. 788,234, dated April 25, 1905.

Application filed January 10, 1903. Serial No. 138,449.

*To all whom it may concern:*

Be it known that I, SAMUEL L. ALLEN, a citizen of the United States, and a resident of Moorestown, State of New Jersey, have invented certain new and useful Improvements in Cultivators, of which the following is a full, clear, and exact description, reference being had to the accompanying drawings, forming part of this specification.

My invention relates to certain improvements in cultivators, and particularly to riding-cultivators adapted to work a number of rows at one operation. In machines of this character the width of the tool-carrying frame or gang is considerably greater than in the average cultivator in order that a large number of teeth may be carried thereby and a number of rows cultivated at one time. Consequently the weight of the gang is very heavy, and considerable power is required to raise the said gang when it is desired to lessen the depth of penetration of the teeth in the soil or to raise the teeth entirely clear of the soil for transportation purposes. Further, it requires considerable power to force a large number of teeth into the soil to any appreciable depth, especially if the soil is hard or loamy.

The principal objects of this invention are to obviate the above-mentioned difficulties by providing means of operating in conjunction with the hand-lever for assisting the operator to lift the gang-frame, also in providing means operating in conjunction with the hand-lever whereby both hand and foot power may be utilized in forcing the teeth into the soil.

A further object of the invention is to provide a simple and efficient means for regulating the height of the tongue, also the height of the doubletree from the ground, and thus regulating to a nicety the amount of weight on the horse's neck.

With these objects in view my invention consists in the construction, arrangement, and combination of parts, such as will be hereinafter fully set forth, and particularly pointed out in the claims made hereto.

Figure 1:
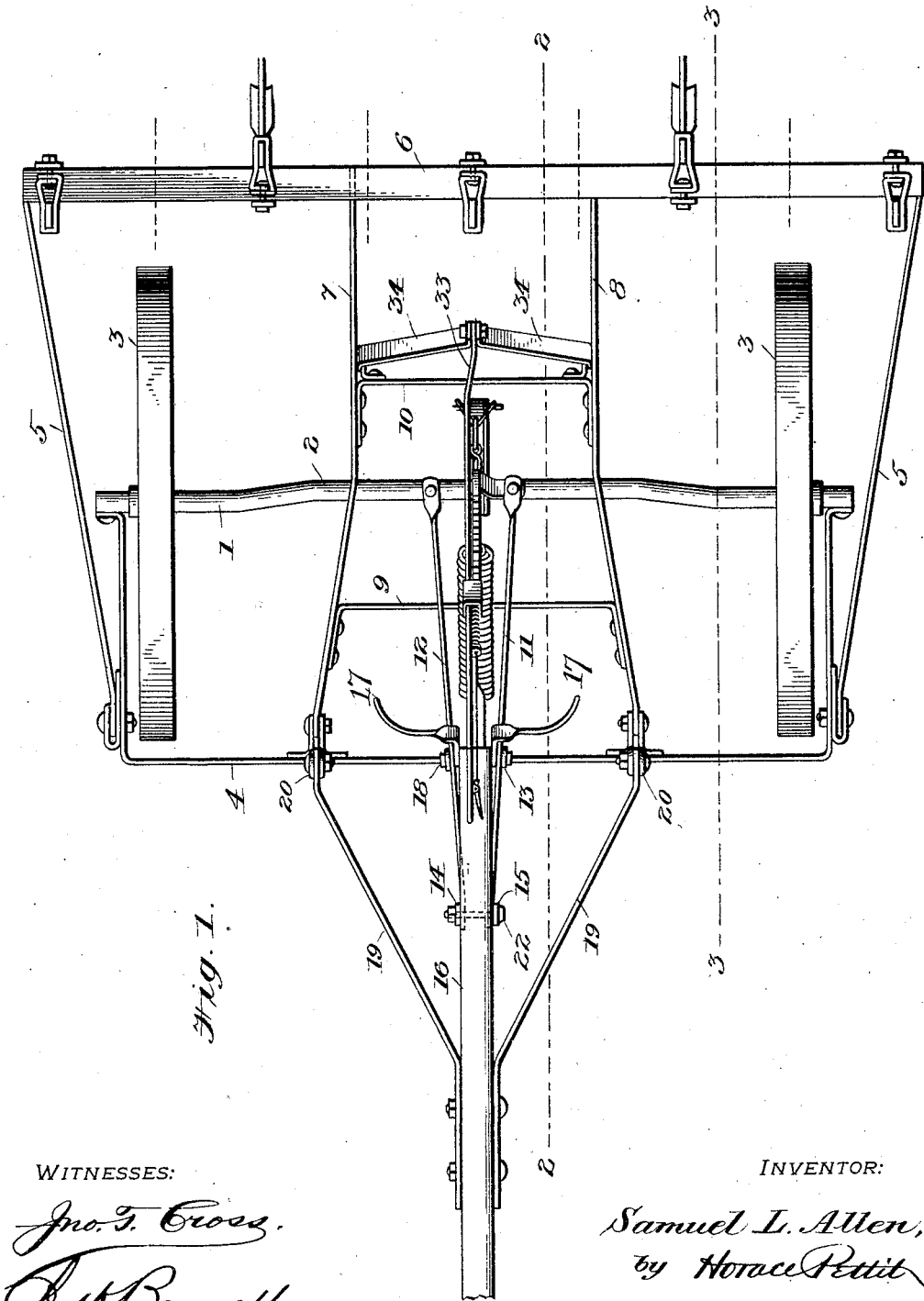
Figure 2:
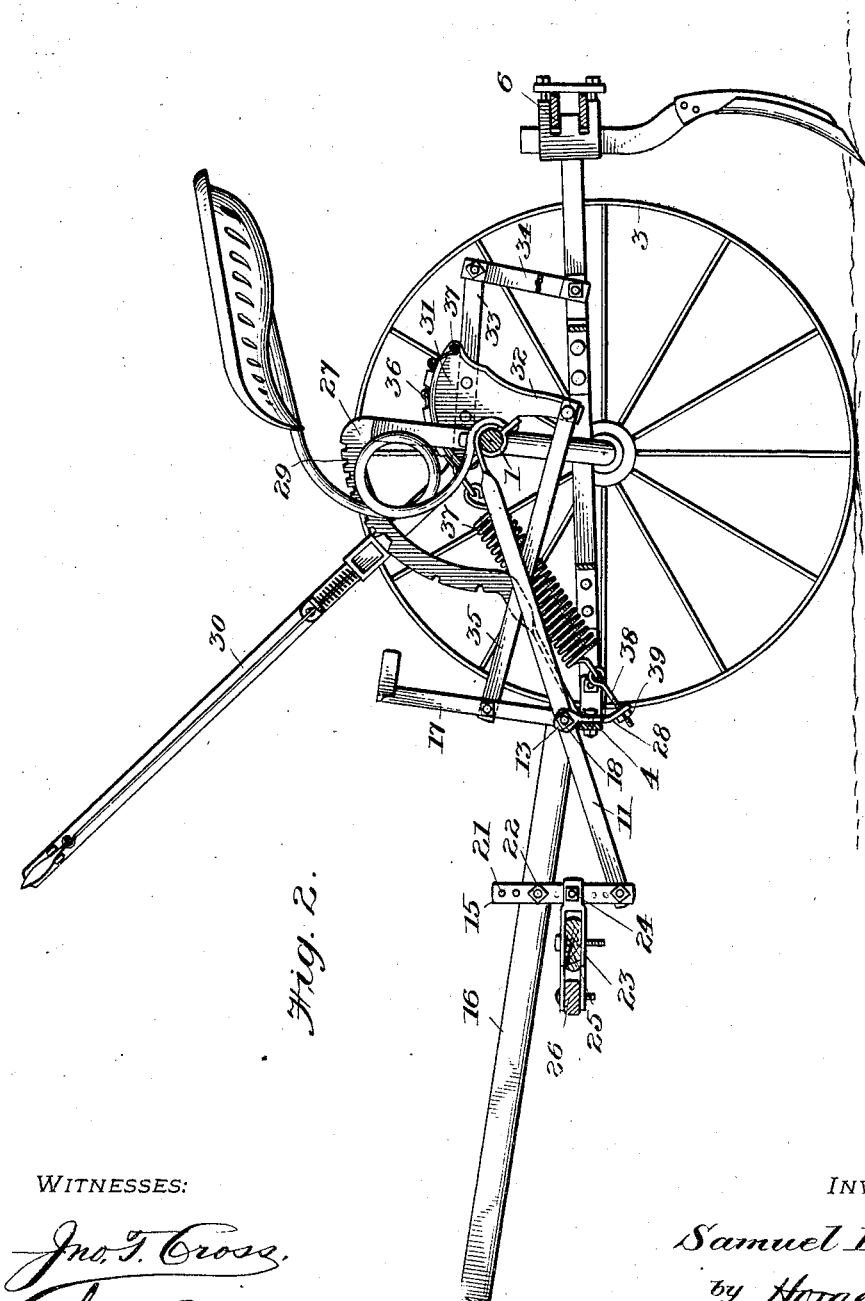
Figure 3:
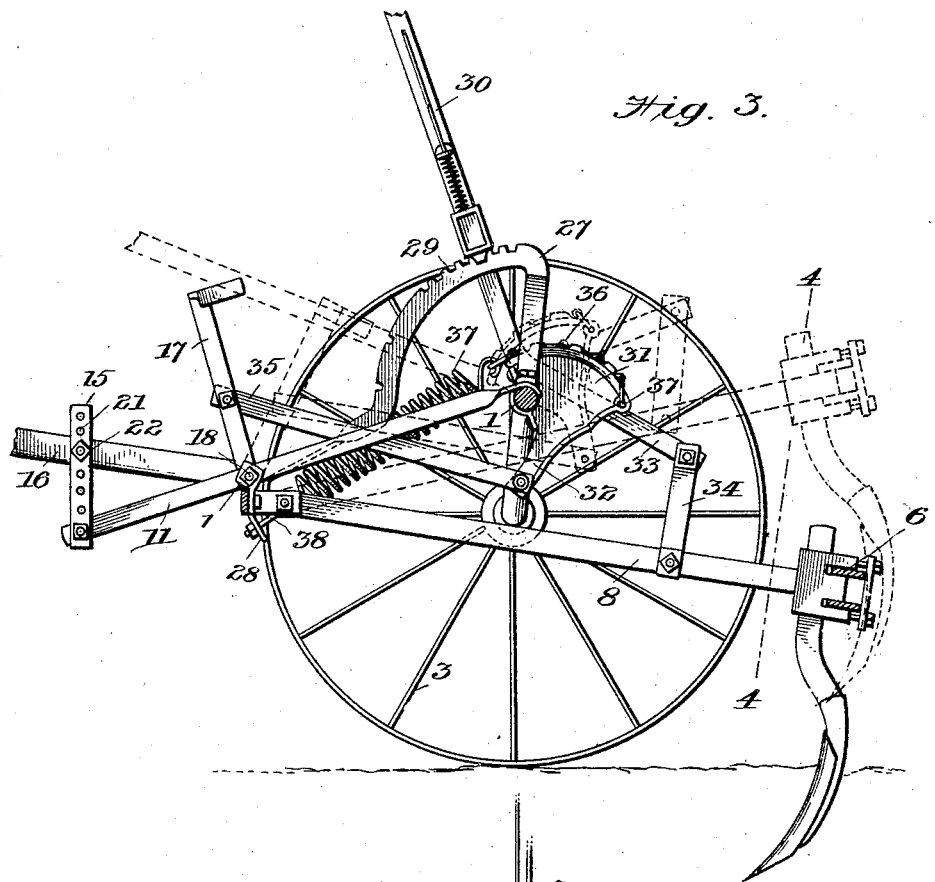

Reference being had to the accompanying drawings, which form a part of this specification, and in which like numerals of reference are used to indicate like parts, Figure 1 is a plan view of a cultivator constructed in accordance with my invention. Fig. 2 is a sectional elevation taken about on the line 2 2 of of Fig. 1. Fig. 3 is a sectional elevation taken on the line 3 3 of Fig. 1, showing the tool-carrying frame lowered and the teeth penetrating the soil, also illustrating in dotted lines the position the parts assume when the tool-carrying frame is elevated for the purpose of lifting the teeth clear of the soil during transportation; and Fig. 4 is a detail rear elevation about on the line 4 4 of Fig. 3.

Figure 4:
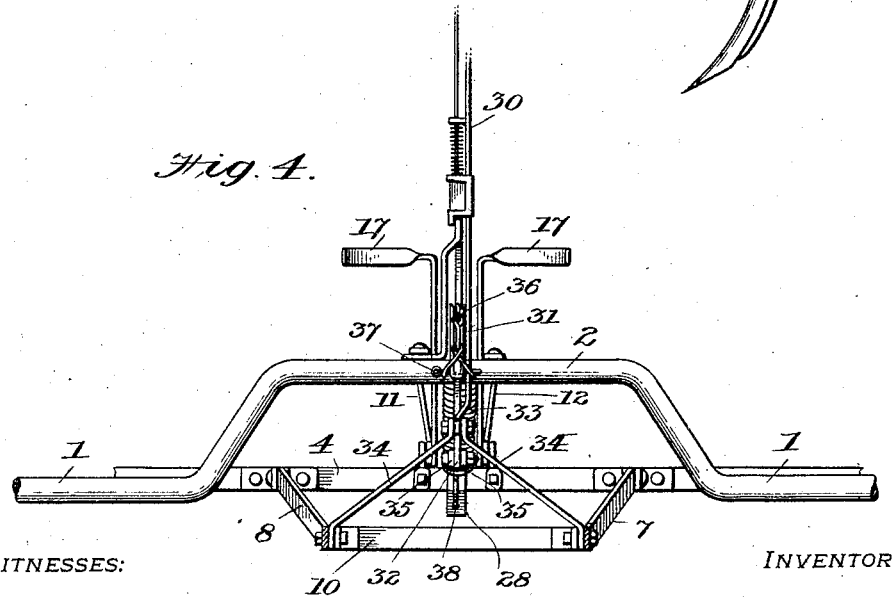

In carrying out my invention I provide an axle 1, which is provided with an arch in its center, as shown at 2 in Fig. 4, and carries on each end the usual metallic supporting-wheels 3. Extending forwardly from each end of the axle 1 is a frame-bar having its ends bent at right angles, forming three sides of a rectangular frame, as indicated at 4, comprising a single steel bar bent in the form illustrated, having each of its ends bolted to the ends of the axle 1 on the outside of the wheels. Pivoted on each side of the frame 4 are the frame-bars 5, which extend rearwardly and are inclined outwardly beyond the wheels, having their outer ends rigidly connected to the twin tool-carrying bars 6, which are disposed transversely to the draft-line of the machine and are adapted to carry the tools. Pivoted to the inside of the front bar of the frame 4 are the two frame-bars 7 and 8, which extend rearwardly and are rigidly connected at their rear ends to the tool-bars 6. These frame-bars 7 are spaced apart, so as to divide the weight of the tool-carrying bars and form a strong and rigid frame in conjunction with the frame-bars 5. To further strengthen the frame, the bars 7 and 8 are connected by the transverse cross-bars 9 and 10. Consequently what I term herein as the "pivoted" tool-carrying frame are the twin bars 6, the outer pivoted bars 5, and the intermediate bars 7 and 8, braced by the cross-bars 9 and 10.

The rectangular frame-bar 4 is braced to the axle 1 by means of the inclined bars 11 and 12, which are bolted at their rear ends to the axle a short distance on each side of its center and at points intermediate its length to a clip 13, which is bolted to the front bar of the frame 4, while the front ends of these brace-bars extend some distance beyond the frame-bar 4 and are bolted to the two vertically-disposed short bars 14 and 15, which bars are bolted to the tongue 16 and serve as a support for said tongue and as a means for regulating the height of the tongue, as will be hereinafter described. The tongue 16 rests at its rear end on top of the front bar 4 and is pivoted to the clips 13 and to the bars 11 and 12 and also to the lower ends of the foot-levers 17 by means of the bolt 18. The tongue is further braced by means of the bars 19, which are pivoted at their rear ends to clips 20, carried by the front bar 4 of the main supporting-frame and which are inclined forwardly and have their front ends bolted securely to the tongue. The vertically-disposed bars 14 and 15 are provided with a series of bolt-holes 21, so that by adjusting the bolt 22, which passes through the tongue 16, the height of the said tongue can be raised or lowered as desired. These bars 14 and 15 also support the clevis 23 by means of the bolt 24, which passes through one of the apertures 21. This clevis 23 carries the doubletree 25, to which the swingletrees 26 are pivoted in the usual manner. By adjusting the bolt 24 in the apertures 21 the height of the doubletree can be regulated, and by this means, together with the tongue adjustment, the amount of weight on the horse's neck may be adjusted to a nicety. Another advantage of this construction of tongue support and adjustment resides in the fact that by adjusting the bars 14 and 15 the tool-carrying frame can be leveled up so that both sets of teeth will enter the ground at substantially the same depth. This is accomplished by removing the bolt 22 from its apertures in the bars 14 and 15 and lowering the said bars, together with the bars 11 and 12, thereby lowering the rigid frame 4 and throwing the axle 1 forward, and thus leveling up the pivoted tool-carrying frame, which supports the gang 6.

A segmental bar 27 is provided, having one end rigidly secured to the axle 1 in about the center of the machine, while its front end is twisted and extended, so as to admit of its being bolted to the inside of the front frame-bar 4, having its end extending a short distance below the bar 4 and terminating in a foot-piece 28. This segmental bar 27 is provided with teeth 29, which are adapted to be engaged by a spring-pressed pawl of the usual construction, which is carried by the lever 30. Pivotally mounted on the axle 1 in the center of the machine to one side of the segmental bar 27 is a segmental cam 31, having a depending arm 32. The lever 30 is rigidly secured to the segment 31, which practically forms an extension of said lever, and has its rear end bent at an angle to its main portion and extends rearwardly from the cam 31, forming an arm 33, which arm is pivotally connected to the brace-bars 34, which are in turn pivoted at their lower ends to the bars 7 and 8, respectively, of the pivoted tool-carrying frame. By this description it will be seen and understood that the lever 30 is practically fulcrumed on the axle 1 of the supporting-frame and that when the said lever is actuated it will lift or lower the pivoted tool-carrying frame and will also swing the segmental cam 31 on its pivotal point, and consequently swing the depending arm 32 in a like manner. Pivoted to the lower end of this depending arm 32, on each side thereof, are the connecting-rods 35, which have their forward ends pivoted to the foot-levers 17 a short distance above the pivotal points 18 of said foot-levers, so that it will be seen that the operator may exert power to lower the pivoted tool-frame and force the teeth into the ground by pushing forwardly with his feet on the foot-levers 17 and by pulling rearwardly with his hands on the lever 30, the power exerted in both instances serving to turn the segmental cam 31, and thus exert pressure on the tool-carrying frame through the medium of the connecting-bars 34.

The top of the cam 31 is grooved for the reception of a chain 36, which is secured at its rear end to a pin 37, carried by the said cam. The front end of the chain 36 is connected to a rather heavy and powerful spring 37 under high tension, which spring is connected at its other end to a bolt 38, which passes through the foot-piece 28, carried by the front frame-bar 4, and is held therein by means of the nut 39, which engages screw-threads provided on the said bolt 38. By means of this nut 39 the tension of the spring 37 may be regulated.

It will be seen that when the parts assume the position illustrated in Fig. 2 of the drawings the spring 37 will be partially closed and not under very high tension; but when the operator actuates the lever 30 and forces the foot-levers 17 outwardly to throw the teeth into the ground the said spring 37 will be extended and its tension greatly increased. When it is desired to raise the tool-carrying frame, the operator simply releases the lever 30 from its connection through the spring-pawl with the teeth of the rack 27 and is then enabled to throw the lever 30 forward and raise the gang-frame with only a slight exertion, as the spring 37 will partly compensate for the weight of the gang and very materially assist in raising the entire tool-carrying frame to any position desired. It is only necessary to raise the tool-carrying frame to the position shown in dotted lines in Fig. 3 when it is desired to transport the machine from the field, and if the tension of the spring is not sufficient to assist the operator in reaching this position he can by using one hand on the lever 30 and the other hand on one of the foot-levers 17 and pushing in the first instance and pulling in the second raise the entire tool-carrying frame to the height desired.

By providing the segmental cam 31 and securing one end of the spring 37 to the rear end of this cam the amount of leverage on the spring will be increased as the operating-lever 30 is thrown forward and the cam 31 raised, thus compensating for the power lost in the spring by its closing, so that it will be seen that the lifting powers of the spring are not diminished to any extent when the tool-carrying frame is raised.

From the above description it will be seen that I have provided a strong and durable construction of cultivator adapted for working a number of rows of crops at one time and at the same time producing a machine which is applicable or adapted to any kind of soil. The mechanism is simple in construction and positive in its operation, and the gang frame and wheels, which are very heavy on machines of this width, are readily raised by the lever. This latter feature is especially advantageous when the end of a row is reached and it is desired to turn the machine into the next row. At the turning-point a hard headland is generally found, and by my arrangement the teeth are very easily raised by the lever, so as to clear the ground. After the turn is made and the machine in position to enter the next row the lever can be used to raise the wheels clear of the hard headland, and upon entering the row the teeth will be ready to enter the cultivated part of the field to their full depth, and the wheels will resume their normal position on the ground without any further adjustment of the operating-levers.

Various changes in the form and arrangement of parts may be made without materially altering my invention or departing from the spirit and scope thereof.

Having thus described my invention, what I claim, and desire to secure by Letters Patent, is—

1. In an agricultural implement, a rigid supporting-frame, a tool-carrying frame pivotally mounted thereon, a lifting mechanism carried by the supporting-frame and connected to the pivoted frame, a compensating spring connected to the supporting-frame and means for connecting said spring with said lifting mechanism and tool-carrying frame, tending to rotate the former and raise the latter.

2. In an agricultural implement, a wheel-supported frame, a tool-carrying frame pivoted thereon a lifting-lever carried by the supporting-frame, a connection between the lifting-lever and the pivoted tool-frame, a rack-and-pawl mechanism for the lifting-lever, a compensating spring connected to the supporting-frame and to the lifting mechanism and tending to rotate the latter in relation to the main frame.

3. In an agricultural implement, a rigid main frame, a tool-carrying frame pivotally mounted thereon, a hand-operated lever connected to the tool-frame, foot-levers acting in conjunction with the hand-lever for depressing the tool-frame, a compensating spring connected to the main frame and indirectly with the tool-carrying frame and adapted to assist in lifting the latter, said spring acting rotatively on said levers and having a tendency to support and raise said tool-carrying frame.

4. In an agricultural implement, a main frame, a tool-carrying frame pivoted thereto, a lifting-lever fulcrumed on the main frame and connected indirectly with the tool-carrying frame, means for holding the lifting-lever adjustably in position, the tension-spring connected to the main frame and to the lifting mechanism, so as to act rotatively on said lifting-lever and assist in raising said tool-carrying frame, and foot-levers operatively connected with the lifting mechanism.

5. In an agricultural implement, a rigid supporting-frame, a tool-carrying frame pivoted to the rigid frame, a lifting-lever fulcrumed on the machine-axle, connections between the end of the lifting-lever and the pivoted tool-frame, foot-levers for depressing the tool-frame pivoted to the main supporting-frame of the machine, and pivoted connecting-rods secured to said foot-levers and to the lifting-lever back of its fulcrum, for the purpose described.

6. In an agricultural implement, a rigid supporting-frame, a tool-carrying frame pivoted to the main frame, a lifting-lever fulcrumed on the machine-axle, connections between the rear ends of the lifting-lever and the pivoted tool-frame, foot-levers pivoted to the main supporting-frame, connecting-rods pivoted to the foot-levers and to an extension of the lifting-lever beyond its fulcrum, and an extension-spring pivoted to the main frame and to the lifting-lever above its fulcrum-point, for the purpose described.

7. In an agricultural implement, a rigid frame, a tool-carrying frame pivoted thereto, a segmental cam loosely mounted on the machine-axle, a hand-lever rigidly secured to said cam having connections with the tool-frame, and a coil-spring connected at one end to the rigid frame and at its other end to the segmental cam and adapted to assist in lifting the tool-frame, for the purpose described.

8. In an agricultural implement, a rigid frame, a tool-carrying frame pivoted to the main frame, a segmental cam pivotally mounted upon the machine-axle, an operating-lever secured to said cam, a connection between the rear end of the operating-lever and the pivoted frame, means for holding the operating-lever in its adjusted position, and an extension-spring pivoted to the forward part of the rigid frame and connecting with the upper face of the cam in rear of its pivotal point and adapted to assist in lifting the tool-frame, for the purpose described.

9. In an agricultural implement, a rigid frame, a tool-carrying frame pivoted thereto, a segmental cam loosely mounted on the machine-axle, a hand-lever rigidly secured to said cam, a connection between the rear end of the hand-lever and the tool-frame, a spiral tension-spring connected at one end to the rigid frame, a flexible connection connected to the other end of said spring and having its other end extending over the surface of the segmental cam and secured to the rear end of said cam, said spring serving to assist in lifting the tool-frame, substantially as described.

10. In an agricultural implement, a main frame adapted to support the wheels, a tool-supporting frame pivotally mounted on the forward part of the main frame, a segmental cam pivotally mounted on the machine-axle, an operating-lever rigidly secured to said cam, means for holding the operating-lever in its adjusted position, a connection between the rear end of the operating-lever and the pivoted tool-carrying frame, a spiral tension-spring secured to the top of the cam and to the forward part of the main frame, foot-levers pivoted to the forward part of the main frame, and connecting-rods pivoted to the foot-levers and to the cam adjacent its rear end, for the purpose described.

11. The combination with the axle and its supporting-wheels, a frame-bar extending forwardly having its rear ends secured to the axle, a segmental rack having one end secured to the axle and its other end to the front frame-bar for bracing the same to the axle, a tool-carrying frame pivoted to the frame-bar, an operating-lever fulcrumed on the axle having a pawl mechanism adapted to engage the teeth of the segmental rack, a connection between the rear end of the operating-lever and the pivoted tool-frame, and a compensating spring acting on the lifting-lever above its fulcrum and secured to the rigid supporting-frame, substantially as described.

12. The combination with a crank-axle and its supporting-wheels, a frame-bar having its ends secured to the said axle, a pivoted tool-carrying frame carried by the said frame-bar, rigid braces connecting the axle with the frame-bar, a segmental cam pivotally mounted on the central portion of the axle, an operating-lever secured to the said segment, means for holding the said lever in its adjusted position, a connection between the rear end of the operating-lever and the pivoted tool-carrying frame, foot-levers pivotally mounted on the front portion of the rigid frame, downwardly-projecting arm formed on the lower end of the segmental cam below its pivot, and connecting-rods pivotally secured to the foot-piece at one end and to the foot-levers at their other ends, substantially as described.

13. In combination, a rigid axle and supporting-frame a tongue having its end pivotally mounted on the supporting-frame, rigid arms extending forward from the supporting-frame, and bars pivoted to the said arms and adjustably connected to the tongue, for the purpose substantially as described.

14. In combination, a rigid supporting-frame and axle, a tongue having its rear end pivotally mounted on the supporting-frame, rigid arms extending forward from the supporting-frame, vertically-disposed bars pivoted to the ends of the rigid arms having a series of bolt-holes provided therein, and a bolt for securing the bars to the tongue, substantially as described.

15. In combination with the machine-axle and its supporting-wheels, a front frame secured to the axle and rigidly braced thereto, a tongue having its end pivotally mounted on the front frame, arms pivoted on the front frame having their rear ends secured to the machine-axle and their front ends extending forward beyond the tongue-pivot, vertically-disposed bars pivoted to the ends of the arms and adjustably connected to the tongue, substantially as described.

16. The combination with the front frame and axle of a tongue pivotally mounted on the front frame, arms secured to the tongue-pivot having their rear ends rigidly secured to the machine-axle and their forward ends extending beyond the tongue-pivot, vertically-disposed bars secured to the forward ends of the arms adapted to embrace the tongue on each side thereof, a series of apertures provided in the said bars, and a bolt passing through one of said apertures and through the tongue, for the purpose described.

17. The combination with the front frame and the axle, of a tongue pivotally mounted on the front frame, inclined arms secured to the tongue-pivot having their rear ends rigidly secured to the machine-axle and their forward ends extending some distance beyond the tongue-pivot, vertically-disposed bars secured to the forward ends of the said arms adapted to embrace the tongue on each side thereof, a series of apertures provided in the vertical bars, a bolt adapted to pass through one of said apertures and through the tongue, and a doubletree secured to the said vertical bars below the tongue and adjustable by means of the apertures and connecting-bolt, substantially as and for the purpose described.

18. The combination with the front frame and axle, of a tongue pivotally mounted on the front frame, rigid arms secured to the tongue-pivot having their rear ends rigidly secured to the machine-axle and their forward ends extending beyond the tongue-pivot, vertically-disposed bars secured to the forward ends of the said arms adapted to embrace the tongue on each side thereof, a securing-bolt adapted to pass through the said bars and through the tongue, and braces pivotally secured to the front frame of the machine and to the tongue on each side thereof, substantially as described.

19. The combination with the arched axle adapted to support the wheels, a rectangular frame-bar attached to the ends of the axle on the outside of the wheels, rigid braces connecting the front frame-bar with the axle, a transversely-disposed tool-bar located in rear of the wheel, inclined side bars pivotally mounted at their forward ends to the front frame-bar and rigidly secured at their rear ends to the tool-bar, intermediate frame-bars pivotally secured at their forward ends to the front frame-bar and rigidly secured at their rear ends to the tool-bars, transverse braces provided between the intermediate frame-bars, and mechanism pivoted on the arched axle and connected with the supporting-frame for raising and lowering the pivoted tool-carrying frame, substantially as described.

In witness whereof I have hereunto set my hand this 27th day of December, A. D. 1902.

SAMUEL L. ALLEN.

Witnesses:
FREDK. C. EBERHARDT,
JNO. T. CROSS.